United States Patent
Masuzawa et al.

(10) Patent No.: US 7,981,359 B2
(45) Date of Patent: Jul. 19, 2011

(54) ROTOR AND PROCESS FOR MANUFACTURING THE SAME

(75) Inventors: Masahiro Masuzawa, Saitama-ken (JP);
Shigeho Tanigawa, Saitama-ken (JP);
Masahiro Mita, Saitama-ken (JP);
Keiko Kikuchi, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 404 days.

(21) Appl. No.: 10/549,043

(22) PCT Filed: Dec. 7, 2004

(86) PCT No.: PCT/JP2004/018221
§ 371 (c)(1),
(2), (4) Date: Sep. 15, 2005

(87) PCT Pub. No.: WO2005/101614
PCT Pub. Date: Oct. 27, 2005

(65) Prior Publication Data
US 2006/0170301 A1    Aug. 3, 2006

(30) Foreign Application Priority Data

Apr. 6, 2004    (JP) .................................. 2004-112150

(51) Int. Cl.
*B22F 3/02* (2006.01)
*B22F 7/02* (2006.01)
*H02K 15/03* (2006.01)

(52) U.S. Cl. .................. 419/66; 29/598; 310/44; 419/6; 264/120

(58) Field of Classification Search ............... 310/44, 310/156.53, 156.56; 419/61–62, 64–66, 419/68; 29/598; 425/112, 352; 264/113, 120

See application file for complete search history.

(56) References Cited

U.S. PATENT DOCUMENTS

| | | | | |
|---|---|---|---|---|
| 4,680,160 | A * | 7/1987 | Helmink | 419/6 |
| 4,687,608 | A * | 8/1987 | Eino | 427/130 |
| 5,122,319 | A * | 6/1992 | Watanabe et al. | 264/109 |
| 5,221,503 | A | 6/1993 | Ward et al. | |
| 5,364,253 | A * | 11/1994 | Kojima et al. | 425/78 |
| 5,495,658 | A * | 3/1996 | Teshigawara et al. | 29/598 |
| 5,536,985 | A * | 7/1996 | Ward et al. | 310/44 |
| 5,693,250 | A * | 12/1997 | El-Antably et al. | 252/62.54 |
| 5,750,044 | A * | 5/1998 | Yoneyama et al. | 252/62.54 |
| 5,903,815 | A * | 5/1999 | Scott | 428/564 |

(Continued)

FOREIGN PATENT DOCUMENTS

EP    0 556 914 A2    8/1993

(Continued)

OTHER PUBLICATIONS

Machine Translation from JPO website of Yoshitaka, JP-07-169633, Detailed Description. Jul. 4, 1995.*

(Continued)

*Primary Examiner* — Burton Mullins
(74) *Attorney, Agent, or Firm* — Sughrue Mion, PLLC

(57) ABSTRACT

A rotor comprising bonded magnet portions mainly composed of magnet powder and a binder, which are embedded in a soft magnetic portion mainly composed of soft magnetic powder and a binder, the rotor being produced by a compression-molding method, and the magnetic pole surfaces of the bonded magnet portions being embedded in the soft magnetic portion.

6 Claims, 12 Drawing Sheets

U.S. PATENT DOCUMENTS

| | | | |
|---|---|---|---|
| 6,423,264 B1* | 7/2002 | Gay | 264/611 |
| 6,432,158 B1* | 8/2002 | Harada et al. | 75/245 |
| 6,655,004 B2* | 12/2003 | Stuart et al. | 29/596 |
| 6,675,460 B2* | 1/2004 | Reiter et al. | 29/596 |
| 6,856,051 B2* | 2/2005 | Reiter et al. | 310/44 |
| 6,868,778 B2* | 3/2005 | Knoth et al. | 100/214 |
| 7,148,598 B2* | 12/2006 | Ionel et al. | 310/156.55 |
| 7,175,404 B2* | 2/2007 | Kondo et al. | 425/78 |
| 7,217,328 B2* | 5/2007 | Nishiuchi et al. | 148/302 |
| 7,364,628 B2* | 4/2008 | Kakimoto et al. | 148/101 |
| 2003/0062660 A1* | 4/2003 | Beard et al. | 264/645 |
| 2003/0062792 A1* | 4/2003 | Reiter et al. | 310/156.56 |
| 2003/0063993 A1 | 4/2003 | Reiter, Jr. et al. | |
| 2004/0052671 A1* | 3/2004 | Okuda | 419/8 |
| 2005/0001499 A1* | 1/2005 | Calico | 310/156.08 |
| 2006/0008376 A1* | 1/2006 | Olsson | 419/66 |

FOREIGN PATENT DOCUMENTS

| | | |
|---|---|---|
| EP | 1184956 A1 | 3/2002 |
| GB | 2265567 * | 10/1993 |
| JP | 06-038415 A | 2/1994 |
| JP | 7-169633 A | 7/1995 |
| JP | 8-331784 A | 12/1996 |
| JP | 2002-100522 A | 4/2002 |
| JP | 2002-134311 A | 5/2002 |
| JP | 2003-92211 A | 3/2003 |
| JP | 2003-319620 A | 11/2003 |
| JP | 2003-328092 A | 11/2003 |

OTHER PUBLICATIONS

Abridged translation of Sakai, et al.; "Characteristics of a Reluctance Motor with Permanent Magnets", at 1998 National Convention Record I.E.E. Japan.

W. L. Soong, T. J. E. Miller, "Practical Filed-Weakening Performance of the Five Clases of Brushless Synchronous AC Motor Drive" at European Power Electronics Conference 1993.

W. L. Soong, D.A. Stanton, T. J. E. Miller, "Design of new Axially-Laminated Permanent Magnet Motor", IEEE Industry Applications Society Annual Meeting 1993.

Abridge translation of Mita, "Eddy Current Analysis of Surface Magnet Motor," '98 Motor Technology Symposium.

European Search Report dated Sep. 30, 2010.

Chinese Office Action dated Dec. 14, 2010.

European Office Action dated Feb. 9, 2011.

* cited by examiner

ROTOR AND PROCESS FOR MANUFACTURING THE SAME

FIELD OF THE INVENTION

The present invention relates to a rotor integrally comprising permanent magnets and a yoke suitable for high-efficiency motors, generators, etc.

BACKGROUND OF THE INVENTION

As permanent magnet motors, there are surface permanent magnet (SPM) motors comprising permanent magnets on peripheral portions of rotors, and interior permanent magnet (IPM) motors comprising permanent magnets embedded in rotors, etc.

As shown in FIG. 16, the SPM motor has a structure in which permanent magnets 31 on a rotor surface are in direct contact with an air gap 34 between the rotor and a stator 33 comprising a yoke 32 and coils 37. The magnetic circuit shown in FIG. 16 is generally called a surface-magnet-type magnetic circuit. A magnetic flux $A_1$ emanating from an N pole of a permanent magnet 31a penetrates the air gap 34, passes through portions 33a, 33b and 33c of the stator yoke 33, and penetrates the air gap 34 again, passes through a permanent magnet 31b and the rotor yoke 32, and returns to an S pole of the permanent magnet 31a, as shown by the arrow.

As shown in FIG. 17, the magnetic circuit of the IPM motor is called a magnet-embedded magnetic circuit or an interior-magnet-type magnetic circuit because permanent magnets 41 are embedded in a yoke 42. The yoke 42 is formed by a laminate of silicon steel sheets punched out to have magnet-shaped holes, and permanent magnets 41 are received in the holes of the yoke 42. A magnetic flux $A_4$ emanating from an N pole of a permanent magnet 41 passes through the rotor yoke 42, penetrates an air gap 44 between a stator 43 and a rotor, successively passes through portions 43a, 43b, 43c of a stator yoke, penetrates the air gap 44 again, passes through the rotor yoke 42, and returns to an S pole of the permanent magnet 41, as shown by the arrow.

Both $B_1$ and $B_2$ in FIGS. 16 and 17 denote short-circuited magnetic fluxes. The magnetic fluxes $B_1$, $B_2$ do not act on the stator, resulting in no contribution to a torque. The magnetic fluxes $B_1$, $B_2$ are undesirable because they eat the magnetic flux contributing to the torque of a motor.

Many proposals were made to provide reluctance motors utilizing the saliency of soft magnetic portions in magnet rotors for a reluctance effect as shown by $A_5$ in FIG. 17 (see Sakai, et. al., "Basic Characteristics of Permanent Magnet Reluctance Motor," at the 1998 Meeting of the Japan Electricity Association, Lecture No. 1002). The reluctance motors are classified to switched reluctance motors and synchronous reluctance motors by stator surfaces. The switched reluctance motor generally comprises a stator having concentrated windings, and a gear-shaped rotor magnetically attracted to the teeth of the stator for rotation. The synchronous reluctance motor generally comprises a stator having distributed windings, and a rotor having one or more magnetic barriers therein. The magnetic barriers form a d-axis through which a magnetic flux easily flows, and a q-axis through which a magnetic flux does not easily flow, the difference in inductance between both axes generating reluctance torque.

Permanent magnets have drastically smaller specific permeabilities than those of soft magnetic materials such as silicon steel, etc. Utilizing the difference in specific permeability between permanent magnets and soft magnetic materials, motors having both characteristics of the permanent magnet motors and the reluctance motors can be achieved. As IPM motors, too, motors using permanent magnets as magnetic barriers to generate reluctance torque, thereby having both characteristics of the permanent magnet motors and the reluctance motors, can be achieved. Particularly because the magnet-embedded motors can effectively utilize magnetic fluxes generated by permanent magnets, they have improved efficiency at a low-speed rotation. They can also rotate up to a high-speed zone by utilizing a by-produced reluctance torque.

Magnet-embedded motors such as synchronous reluctance motors are called "reluctance permanent magnet (RPM) motors," utilizing mainly a magnet torque and auxiliarily a reluctance torque. See W. L. Soong, T. J. E. Miller: "Practical Field-Weakening Performance of the Five Classes of Brushless Synchronous AC Motor Drive," Proceedings of European Power Electronics Conference (1993), and W. L. Soong, D. A. Stanton, T. J. E. Miller: "Design of New Axially-Laminated Permanent Magnet Motor," Proceedings of IEEE Industry Applications Society Annual Meeting (1993).

Such drastic improvement of the characteristics of permanent magnets provides motors with intermediate characteristics between the permanent magnet motors and the reluctance motors. Among them, permanent magnet-embedded motors are promising, because they have high efficiency and high-accuracy control, and because they can be provided with optimized characteristics for motor applications.

On the other hand, in motors widely used at present, thin plates such as silicon steel sheets, etc. having openings for permanent magnets are laminated, and constituent members are small. Accordingly, such motors are not suitable for high-speed rotation. In addition, because permanent magnets inserted into the above openings are adhered, clearance is needed to absorb working tolerance between the permanent magnets and the silicon steel sheets. This clearance acts as an air gap in a magnetic circuit, thereby lowering the efficiency of motors. Further, the clearance deteriorates the positional accuracy of the permanent magnets, resulting in uneven magnetic pole pitches and thus a cogging torque.

In addition, to lower a production cost, it is necessary to provide the permanent magnets and the silicon steel sheets with simple shapes, thereby simplifying their working. Accordingly, it is difficult to produce extremely thin portions of the permanent magnets and the silicon steel sheets with high accuracy. To effectively use a reluctance torque, however, there is an increasingly higher demand to provide irregularly shaped magnets. To solve such problems, JP 7-169633 A proposes a method for integrally molding permanent magnets and a soft magnetic material. However, this method is applicable only to the SPM motors, failing to solve the production problems of the magnet-embedded motors.

A magnet-embedded rotor needs bridging soft magnetic portions for avoiding impact and for reinforcement between pluralities of permanent magnets, but these portions permit the short-circuiting of a magnetic flux generated by the permanent magnets, resulting in a leaked magnetic flux. Accordingly, the magnetic generated by the permanent magnets cannot be fully used. To solve such problems, JP 8-331784 A proposes the construction of a yoke by a member having both magnetic portions and non-magnetic portions, and the formation of non-magnetic portions in the bridging portions. However, this technology fails to solve the above problems in working or production.

When magnet powder and soft magnetic powder are integrally compression-molded, a compression-molded body is subjected to cracking by springback at the time of removing it from a die. Even if no cracking occurred, a rotor assembled in a motor would likely be cracked by a centrifugal force if there were a weak press-bonding strength between the magnetic portions and the non-magnetic portions.

JP 2002-134311 A proposes a method for forming bonded magnets in a rotor without clearance by laminating thin plates such as silicon steel sheets, etc. having openings for receiving magnets, and injecting a compound for the bonded magnets into the openings. However, because the compound should contain a large amount of a resin (a small amount of magnet powder or iron powder) to have high flowability in this method, the resultant rotor suffers low magnetic characteristics. In addition, the larger the motor is, the more current flows in permanent magnets, resulting in an increased eddy current loss. To reduce the eddy current loss, Mita, "Eddy Current Analysis of Surface Magnet Motor," '98 Motor Technology Symposium (1998) describes that a pole of each magnet should be divided, and that the flow of electric current should be cut by surface coatings or bonding layers. However, this method needs a lot of steps, resulting in a high production cost.

OBJECTS OF THE INVENTION

Accordingly, an object of the present invention is to provide a permanent magnet-embedded rotor free from gaps between permanent magnets and a soft magnetic material and cracking due to springback, capable of effectively utilizing a magnetic force generated by permanent magnets because of a high degree of freedom in their shapes, and having high press-bonding strength between bonded magnet portions and a soft magnetic portion.

Another object of the present invention is to provide a method for producing such a permanent magnet-embedded rotor.

DISCLOSURE OF THE INVENTION

Thus, the rotor of the present invention comprises a soft magnetic portion mainly composed of soft magnetic powder and a binder, and bonded magnet portions mainly composed of magnet powder and a binder and embedded in the soft magnetic portion, the rotor being formed by a compression-molding method, and the magnetic pole surfaces of the bonded magnet portions being substantially embedded in the soft magnetic portion.

In one embodiment of the present invention, the end surfaces of the bonded magnet portions are exposed on a peripheral side surface of the rotor, the width of each exposed end surface having being 2% or less of the entire periphery of the rotor. In another embodiment of the present invention, the bonded magnet portions are totally embedded in the soft magnetic portion, the thinnest portion of the soft magnetic portion between the bonded magnet portions and the peripheral side surface of the rotor having a thickness of 0.3-1.5 mm.

The bonded magnet portions each having a circular shape curved toward a center of the rotor are preferably arranged such that the rotor has magnetic poles in an even number of 4-12. The arcuate bonded magnet portions are preferably circularly connected.

The magnet powder preferably has an average particle size of 50-200 μm, and the soft magnetic powder preferably has an average particle size of 1-50 μm.

The soft magnetic portion preferably has electric conductivity of 20 kS/m or less, Bm of 1.4 T or more, and coercivity Hc of 800 A/m or less. The bonded magnet portions preferably have a residual magnetic flux density Br of 0.4 T or more and Hcj of 600 kA/m or more. A shear strength between the bonded magnet portions and the soft magnetic portion is preferably 10 MPa or more.

The first method of the present invention for producing a rotor comprising bonded magnet portions and a soft magnetic portion comprises preliminarily molding the bonded magnet portions from a magnet powder compound mainly composed of magnet powder having an average particle size of 50-200 μm and a binder; preliminarily molding the soft magnetic portion from a soft magnetic powder compound mainly composed of soft magnetic powder having an average particle size in a range of 1-50 μm, and a binder, such that the soft magnetic portion is in contact with the bonded magnet portions; and making the bonded magnet portions and the soft magnetic portion integral at a higher pressure than a preliminary molding pressure.

The second method of the present invention for producing a rotor comprising bonded magnet portions and a soft magnetic portion comprises preliminarily molding (a) the bonded magnet portions from a magnet powder compound mainly composed of magnet powder having an average particle size of 50-200 μm and a binder, and (b) the soft magnetic portion from a soft magnetic powder compound mainly composed of soft magnetic powder having an average particle size in a range of 1-50 μm, and a binder, separately; assembling the bonded magnet portions and the soft magnetic portion; and making them integral at a higher pressure than a preliminary molding pressure.

The third method of the present invention for producing a rotor comprising bonded magnet portions and a soft magnetic portion comprises preliminarily molding the soft magnetic portion from a soft magnetic powder compound mainly composed of soft magnetic powder having an average particle size in a range of 1-50 μm, and a binder; preliminarily molding the bonded magnet portions from a magnet powder compound mainly composed of magnet powder having an average particle size of 50-200 μm and a binder, such that the bonded magnet portions are in contact with the soft magnetic portion; and making the soft magnetic portion and the bonded magnet portions integral at a higher pressure than the preliminary molding pressure.

In any methods for producing a rotor, it is preferable to use a thermosetting resin as the binder, and to conduct a thermosetting treatment after the bonded magnet portions and the soft magnetic portion are made integral.

DESCRIPTION OF THE PREFERRED EMBODIMENTS

Figure 1A:
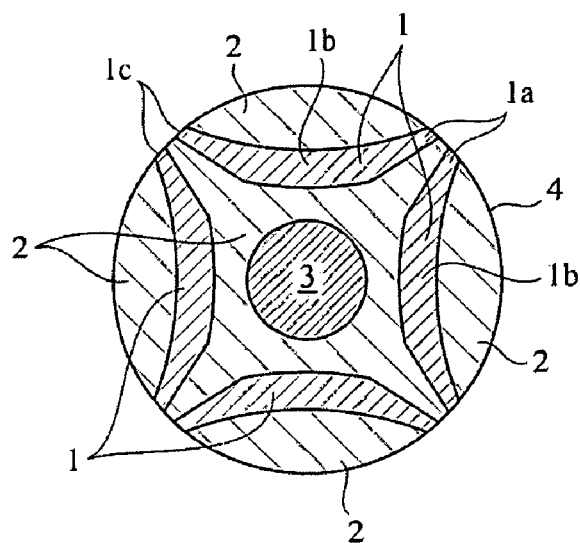
FIG. 1(a) is a schematic cross-sectional view showing a permanent magnet-embedded rotor according to one embodiment of the present invention.

[1] Rotor
[A] Composition
(1) Powder

Though not particularly restricted, the magnet powder are preferably, for instance, Sm—Co magnet powder comprising as basic components a rare earth element (mainly Sm) and a transition metal (mainly Co); R-T-B magnet powder comprising R (at least one of rare earth elements including Y), T (transition metal, mainly Fe) and B as basic components; R-T-N magnet powder comprising a rare earth element (mainly Sm), T (transition metal, mainly Fe) and N as basic components; or these mixtures. The magnet powder may be either isotropic or anisotropic. Because a magnetic flux is shorted-circuited in a permanent magnet-embedded rotor, a sufficient magnetic flux cannot be obtained on a rotor surface, when a residual magnetic flux density Br is less than 0.4 T as in bonded ferrite magnets, for instance. Accordingly, it is preferable to use bonded rare earth magnets having $Br \geqq 0.4$ T, and coercivity $Hcj \geqq 600$ kA/m.

The soft magnetic powder is preferably atomized iron powder, Fe—Co powder, Fe-based, nanocrystalline magnetic powder, etc. The soft magnetic powder preferably has electric conductivity of 20 kS/m or less, Bm of 1.4 T or more, and Hc of 800 A/m or less. When the electric conductivity is 20 kS/m or less, eddy current loss can be reduced to substantially the same level as insulated laminates of silicon steel sheets. When Bm is less than 1.4 T, a sufficient magnetic flux cannot be obtained. When Hc is more than 800 A/m, there is a remarkable hysteresis loss during the rotation of a motor, resulting in a motor with extremely low efficiency.

The magnet powder preferably has an average particle size of 50-200 μm, and the soft magnetic powder preferably has an average particle size of 1-50 μm, smaller than that of the magnet powder. Because of difference in particle size between the magnet powder and the soft magnetic powder, bonded magnet portions and soft magnetic portions have high bonding strength, thereby suppressing cracking. The more preferred average particle size is 80-150 μm for the magnet powder, and 5-30 μm for the soft magnetic powder.

The magnet powder and the soft magnetic powder are preferably provided with an insulating coating, to increase electric resistance and reduce an eddy current loss during the rotation of a motor.

(2) Binder

Binders are preferably thermosetting resins such as epoxy resins, phenol resins, urea resins, melamine resins, thermosetting polyester resins, etc. The amount of the binder is preferably 1-5 parts by mass, more preferably 1-4 parts by mass, per 100 parts by mass of the magnet powder. It is also preferably 0.1-3 parts by mass, more preferably 0.5-2 parts by mass, per 100 parts by mass of the soft magnetic powder. A too small amount of the binder provides a rotor with extremely low mechanical strength. On the other hand, a too much amount of the binder provides a rotor with extremely low magnetic characteristics.

[B] Structure

An IPM rotor utilizing a reluctance torque can generate a larger motor output than an SPM rotor. However, the use of a reluctance torque subjects a rotor yoke to an excessive alternating magnetic field, resulting in a remarkable eddy current loss. To avoid the eddy current loss, it is necessary to extremely reduce electric conductivity in an integrally molded rotor comprising bonded magnet portions and soft magnetic portions. Accordingly, the rotor of the present invention should have a peripheral side surface covered by a thin soft magnetic portion. In this case, the soft magnetic portion preferably has electric conductivity of 20 kS/m or less.

To prevent the short-circuiting of a magnetic flux, the IPM rotor preferably has thin soft magnetic portions between the bonded magnet portions and a peripheral side surface. In a rotor having such a structure that magnets are inserted into openings in the soft magnetic portions constituted by silicon steel sheets, etc., portions of the silicon steel sheets between the magnets and the peripheral side surface cannot be made very thin to secure mechanical strength. On the other hand, in the rotor of the present invention having such a structure that bonded magnet portions and soft magnetic portions are integrally molded, there is a large degree of freedom in the design of thin portions, resulting in less restriction in the thickness of the thin portions. Specifically, the thinnest portions in the soft magnetic portions between the outer surfaces of the bonded magnet portions and the peripheral side surface of the rotor preferably have a thickness in a range of 0.3-1.5 mm.

(1) Embodiments

FIG. 1(a) shows a permanent magnet-embedded rotor according to one embodiment of the present invention. In the rotor in this embodiment, arcuate bonded magnet portions 1 each having a thicker center portion 1b than an end 1a are embedded in soft magnetic portions 2, and the ends 1a, 1a of adjacent bonded magnet portions 1, 1 are separated such that there is no short-circuiting of a magnetic flux between magnetic poles. Each end surface 1c is exposed on a peripheral side surface 4. The bonded magnet portion 1 is sufficiently thicker in the center portion 1b than in the end 1a, such that it is thick in a magnetization direction to provide a sufficient magnetic force. The rotor has a rotation shaft 3 tightly bonded to the soft magnetic portion 2 at center. The exposure ratio of the end surface 1c is preferably 2% or less.

Figure 1B:
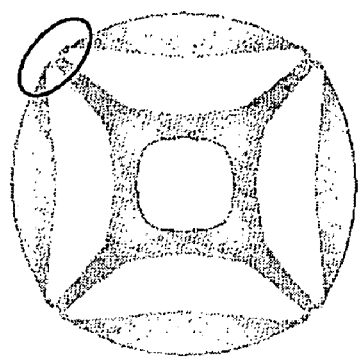
FIG. 1(b) is a schematic view showing a tensile stress distribution in the permanent magnet-embedded rotor shown in FIG. 1(a) when it was deformed.

FIG. 1(b) shows a tensile stress distribution in the rotor of FIG. 1(a) when it was deformed. It should be noted that displacement is exaggerated to 2000 times in any figures showing a stress distribution. As is clear from FIG. 1(b), the largest stress is applied to the exposed end surfaces 1c of the magnets. The bonded magnet portions 1 are preferably arranged in the rotor such that the rotor has magnetic poles in even numbers of 4-12. It is preferable to circularly connect the arcuate bonded magnet portions 1, to provide their end surfaces (magnetic pole surfaces) 1c with a large area ratio, resulting in a larger amount of a magnetic flux and a larger reluctance effect.

Figure 2A:
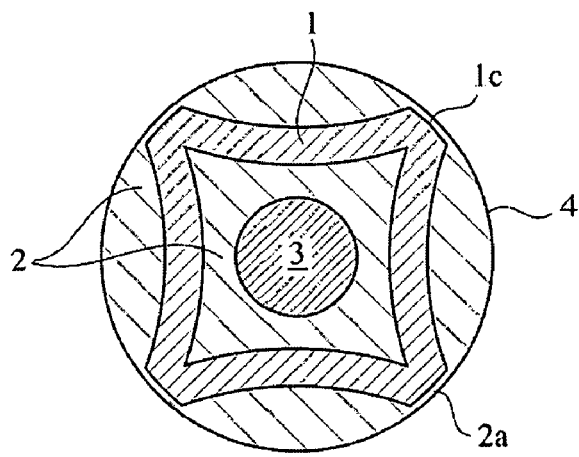
FIG. 2(a) is a schematic cross-sectional view showing a permanent magnet-embedded rotor according to another embodiment of the present invention.
Figure 2B:
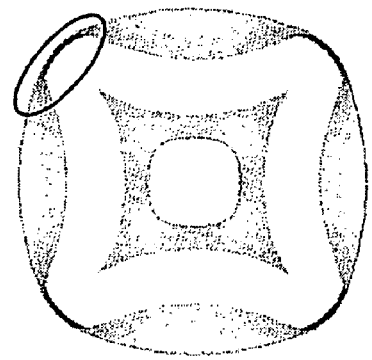
FIG. 2(b) is a schematic view showing a tensile stress distribution in the permanent magnet-embedded rotor shown in FIG. 2(a) when it was deformed.

FIG. 2(a) shows a permanent magnet-embedded rotor according to another embodiment of the present invention. The end surfaces 1c of arcuate bonded magnet portions 1 are not exposed on a peripheral side surface 4, and the thinnest portions 2a of a soft magnetic portion 2 between the end surface 1c of the bonded magnet portions 1 and the peripheral side surface 4 are as thin as 0.3-1.5 mm. As shown in FIG. 2(b), the largest tensile stress is applied to the thinnest portions 2a of the soft magnetic portion 2 in this rotor.

Figure 3A:
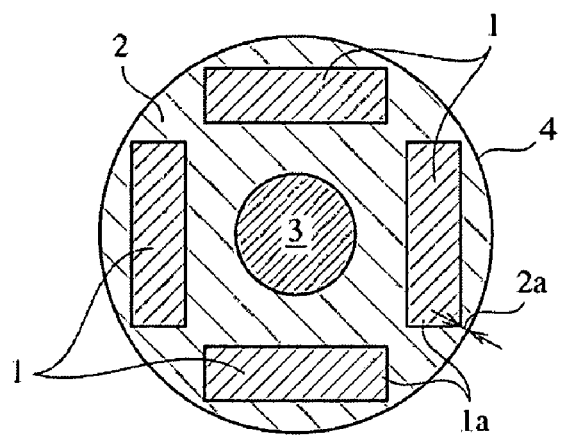
FIG. 3(a) is a schematic cross-sectional view showing a permanent magnet-embedded rotor according to a further embodiment of the present invention.
Figure 3B:
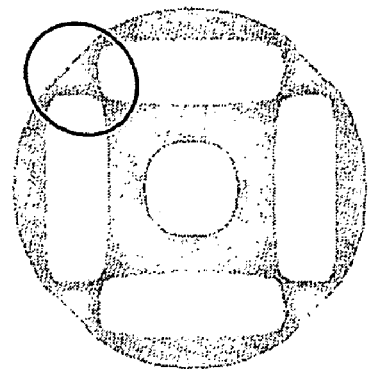
FIG. 3(b) is a schematic view showing a tensile stress distribution in the permanent magnet-embedded rotor shown in FIG. 3(a) when it was deformed.

FIG. 3(a) shows a rotor comprising bonded magnet portions 1 each having a rectangular cross section embedded in a soft magnetic portion 2 with gaps between their ends 1a. FIG. 3(b) shows a tensile stress distribution in the rotor of FIG. 3(a) when it was deformed. The largest tensile stress is applied to the thinnest portion 2a of the soft magnetic portion 2 between the ends 1a of the bonded magnet portions 1 and the peripheral side surface 4.

Figure 4A:
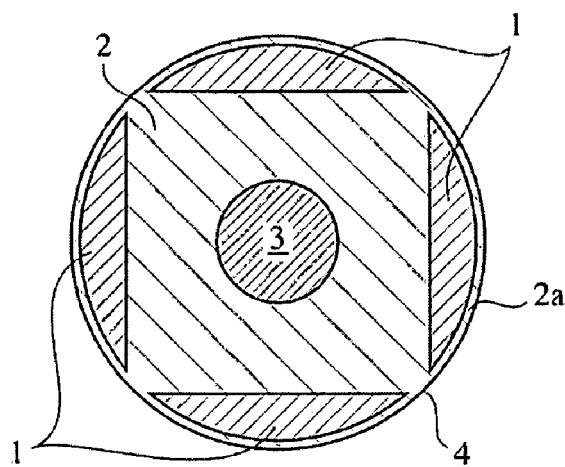
FIG. 4(a) is a schematic cross-sectional view showing a permanent magnet-embedded rotor according to a still further embodiment of the present invention.
Figure 4B:
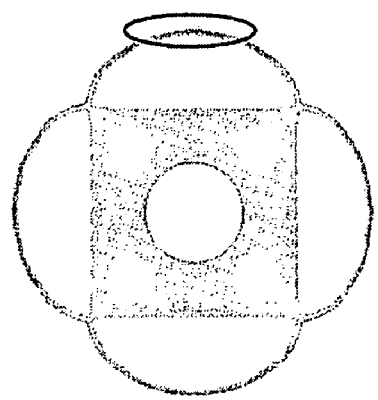
FIG. 4(b) is a schematic view showing a tensile stress distribution in the permanent magnet-embedded rotor shown in FIG. 4(a) when it was deformed.

FIG. 4(a) shows a rotor comprising fan-shaped bonded magnet portions 1 embedded in a soft magnetic portion 2. Each bonded magnet portion 1 has a cross section shape having a circular side along a peripheral side surface 4 of the rotor and a linear base. FIG. 4(b) shows a tensile stress distribution in the rotor of FIG. 4(a) when it was deformed. As is clear from FIG. 4(b), the largest tensile stress is applied to the thin portion 2a of the soft magnetic portion 2 between the bonded magnet portion 1 and the peripheral side surface 4.

Figure 5A:
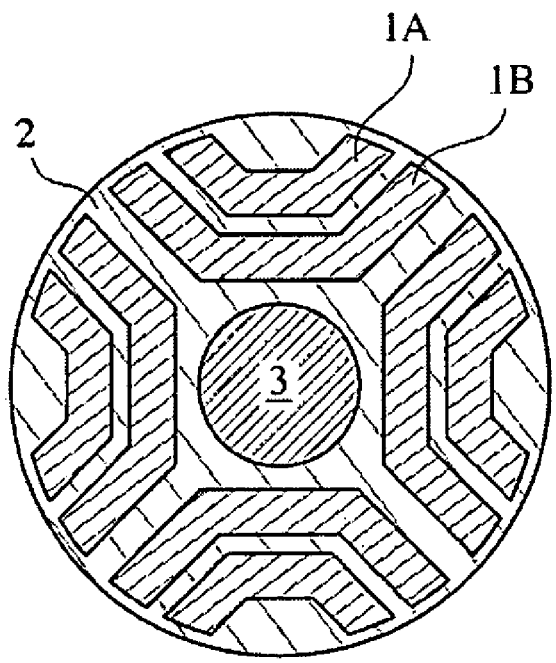
FIG. 5(a) is a schematic cross-sectional view showing a permanent magnet-embedded rotor having each magnetic pole provided by pluralities of bent bonded magnet portions.
Figure 5B:
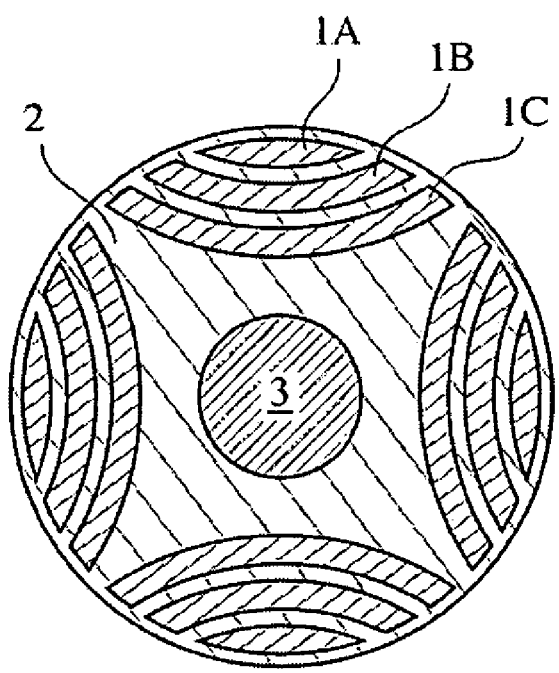
FIG. 5(b) is a schematic cross-sectional view showing a permanent magnet-embedded rotor having each magnetic pole provided by pluralities of arcuate bonded magnet portions.
Figure 6A:
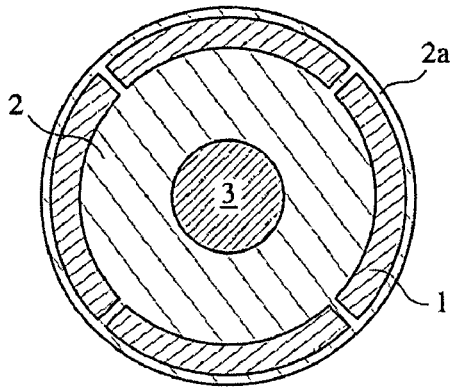
FIG. 6(a) is a schematic cross-sectional view showing a permanent magnet-embedded rotor according to a still further embodiment of the present invention.
Figure 6D:
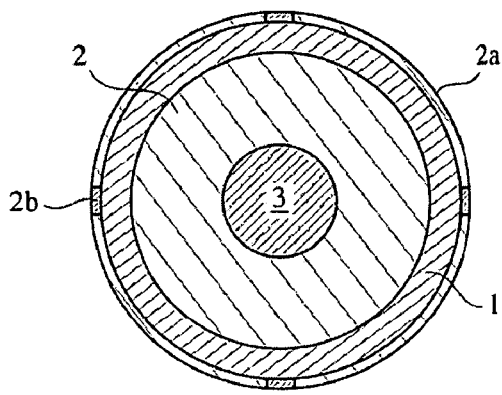
FIG. 6(d) is a schematic cross-sectional view showing a permanent magnet-embedded rotor according to a still further embodiment of the present invention.
Figure 6B:
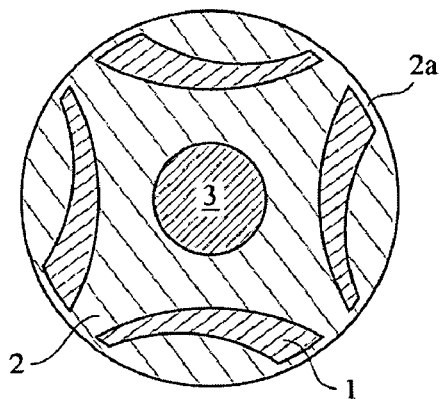
FIG. 6(b) is a schematic cross-sectional view showing a permanent magnet-embedded rotor according to a still further embodiment of the present invention.
Figure 6E:
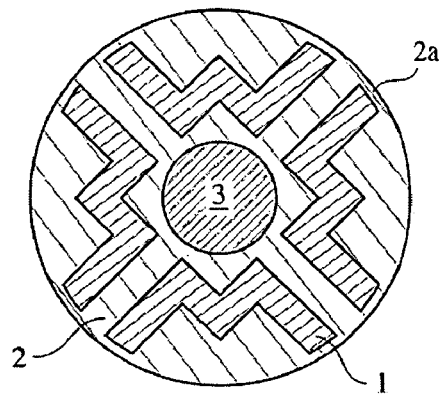
FIG. 6(e) is a schematic cross-sectional view showing a permanent magnet-embedded rotor according to a still further embodiment of the present invention.
Figure 6C:
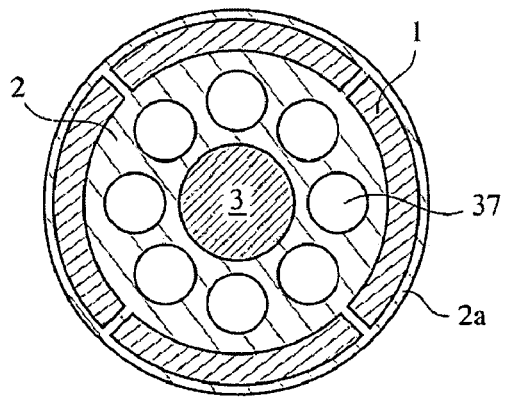
FIG. 6(c) is a schematic cross-sectional view showing a permanent magnet-embedded rotor according to a still further embodiment of the present invention.

FIG. 5(a) shows a permanent magnet-embedded rotor according to a still further embodiment of the present invention, in which each magnetic pole is formed by pluralities of bent bonded magnet portions 1A, 1B, and FIG. 5(b) shows a permanent magnet-embedded rotor according to a still further embodiment of the present invention, in which each magnetic pole is formed by pluralities of arcuate bonded magnet portions 1A, 1B, 1C. The rotor having laminar bonded magnet portions as shown in FIGS. 5(a) and 5(b) can generate a larger reluctance torque than the rotor having single-layer, bonded magnets portion as shown in FIG. 1.

FIGS. 6(a)-6(e) show permanent magnet-embedded rotors according to still further embodiments of the present invention. Each rotor comprises the thinnest portions 2a of the soft magnetic portion 2 between bonded magnet portions 1 and a peripheral side surface 4 of the rotor. The reference numeral 37 in FIG. 6(c) denotes holes, and the reference numeral 2b in FIG. 6(d) denotes non-magnetic bodies.

Figure 7A:
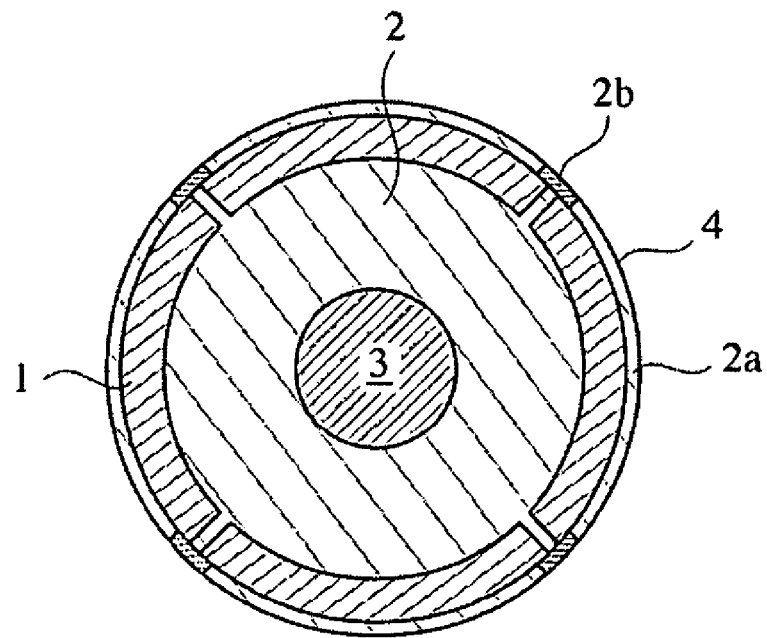
FIG. 7(a) is a schematic cross-sectional view showing a permanent magnet-embedded rotor according to a still further embodiment of the present invention.
Figure 7B:
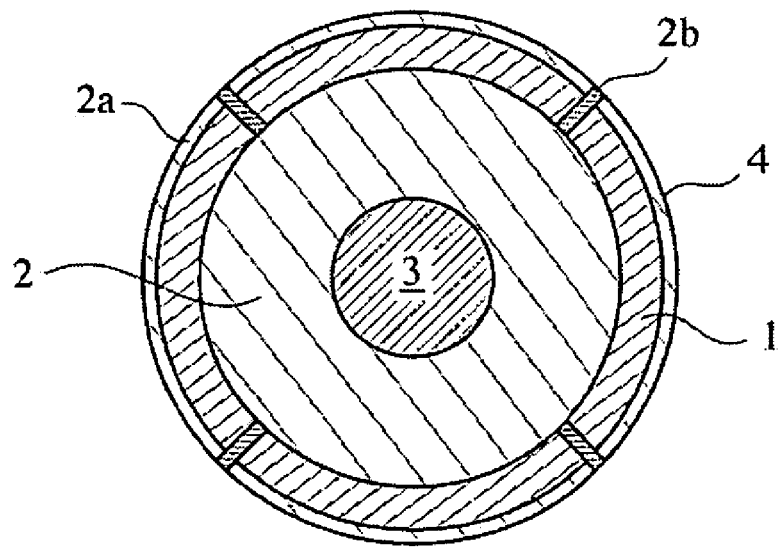
FIG. 7(b) is a schematic cross-sectional view showing a permanent magnet-embedded rotor according to a still further embodiment of the present invention.

FIGS. 7(a) and 7(b) show permanent magnet-embedded rotors according to still further embodiment of the present invention. Each rotor comprises the thinnest portions 2a of the soft magnetic portion 2 between bonded magnet portions 1 and a peripheral side surface 4 of the rotor. The reference numeral 2b denotes non-magnetic bodies.

(2) Exposure Ratio of End Surfaces of Bonded Magnet Portions

Figure 11:
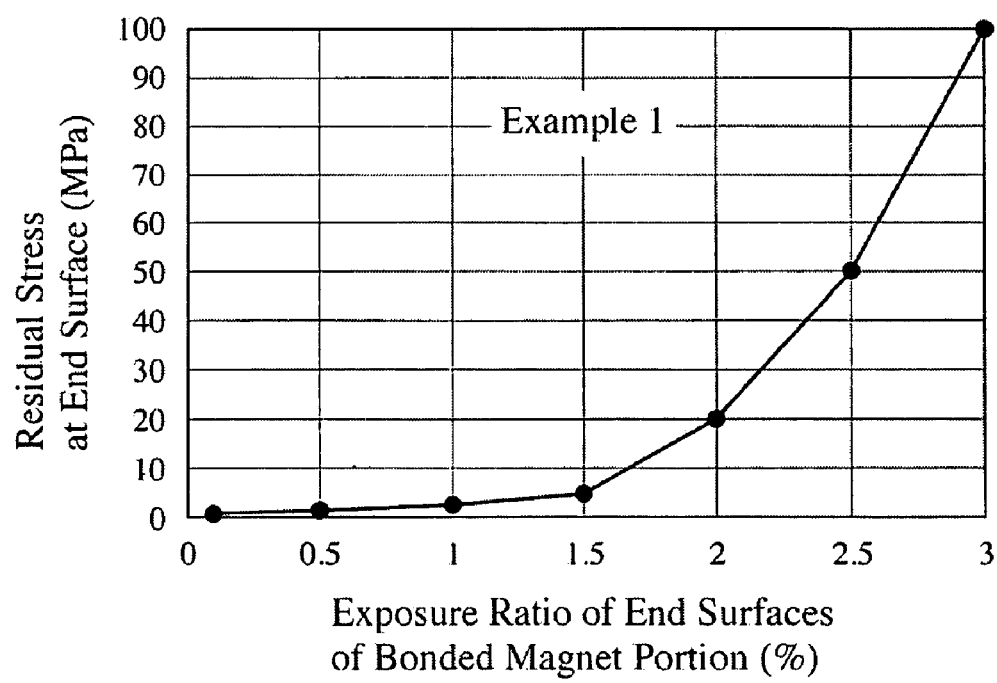
FIG. 11 is a graph showing the relation between an exposure ratio of the end surfaces of a bonded magnet portion and a residual stress at the end surface.

When compression molding is conducted under as high pressure as about 500-1000 MPa, cracking occurs vigorously by springback. This is due to the fact that expansion by the springback is about 0.3% in the soft magnetic portion, while it is differently about 0.9% in the bonded magnet portions, providing the resultant rotor with residual stress. Because the soft magnetic portion has a tensile strength of about 50 MPa, while the bonded magnet portions have as small a tensile strength as about 25 MPa, cracking occurs in the bonded magnet portions. As a result of detailed investigations to reduce the residual stress under the desired level, it has been found that in the case of a rotor in which the end surfaces of bonded magnet portions are exposed to a peripheral side surface of the rotor, cracking can be prevented when the width of each exposed end surface is 2% or less of the entire periphery of the rotor. It has also been found that this ratio is substantially constant regardless of the shapes of the bonded magnet portions. In the graph of FIG. 11 showing the relation between a residual stress and the exposure ratio of end surfaces, for instance, the residual stress would change as slightly as almost by the thickness of one curve even if the bonded magnet portions were provided with different shapes. This is due to the fact that a stress is concentrated near the peripheral surface of the rotor. Accordingly, cracking can be suppressed by reducing the residual stress on the peripheral surface of the rotor.

(3) Thinnest Portion of Soft Magnetic Portion

In the case of a rotor having bonded magnet portions completely embedded therein, the thinnest portions of a soft magnetic portion between the bonded magnet portions and a peripheral side surface of the rotor are preferably as thick as 0.3-1.5 mm. When the thinnest portions are thinner than 0.3 mm, molding is difficult, and a residual stress is concentrated in the thinnest portions, resulting in cracking in the rotor. On the other hand, when the thinnest portions are thicker than 1.5 mm, a magnetic flux is shorted-circuited in the thinnest portions, providing the rotor with lowered magnetic characteristics. It has been found that the preferred thickness of the thinnest portions is substantially independent of the shapes of the bonded magnet portions. The outer diameter of the rotor is preferably about 15-150 mm for practical applications.

(4) Density

A rotor compression-molded at as high pressure as 500-1000 MPa has a density of 5.5-6.0 $Mg/m^3$ in the bonded R-T-B magnet portion, 5.4-6.0 $Mg/m^3$ in the bonded R-T-N magnet portion, and 6.0-6.5 $Mg/m^3$ in the soft magnetic Fe powder portion, for instance.

[2] Production Method

The permanent magnet-embedded rotor of the present invention can be produced by the following three methods.
(1) A method comprising placing a preliminarily molded body of magnet powder and a thermosetting binder in a die, charging a compound mainly composed of a soft magnetic powder and a thermosetting binder into the die to carry out preliminary molding, applying higher pressure than the preliminary molding pressure to them to make them integral, and finally curing the thermosetting binder.
(2) A method comprising forming a preliminarily molded body of magnet powder and a thermosetting binder and a preliminarily molded body of soft magnetic powder and a thermosetting binder separately, placing both preliminary molded bodies in combination in a die, applying higher pressure than the preliminary molding pressure to them to make them integral, and finally curing the thermosetting binder.
(3) A method comprising placing a preliminarily molded body of soft magnetic powder and a thermosetting in a die, charging a compound mainly composed of a soft magnetic powder and a thermosetting binder into the die to carry out preliminary molding, applying higher pressure than the preliminary molding pressure to them to make them integral, and finally curing the thermosetting binder.

Among them, the method (1) is most preferable because of high adhesion of the bonded magnet portion to the soft magnetic portion. Thus, taking the method (1) for example, the production method of the present invention will be explained in detail. It should e noted, however, that this explanation will be applied to the methods (2) and (3) without modifications as long as there is no contradiction.

[A] Production of Compound

A compound (magnet powder compound) mainly composed of magnet powder (particularly rare earth magnet powder) and a binder, and a compound (soft magnetic powder compound) mainly composed of soft magnetic powder and a binder are prepared. An anti-oxidant and a lubricant may be added to each compound. A stabilizer, a molding aid, etc. may also be added to the compound.

The anti-oxidant prevents the oxidation of the magnet powder and the soft magnetic powder, preventing these powders from having deteriorated magnetic characteristics, and improving the thermal stability of the compounds to blending and molding, thereby enabling them to keep good moldability even with a small amount of the binder. Usable as the anti-oxidant are, for instance, tocopherols, amine compounds, amino acid compounds, nitro-carboxylic acids, hydrazine compounds, cyano compounds, chelating agents such as sulfides capable of forming chelates with metal ions, particularly Fe, etc.

The lubricant improves the flowability of the compound during blending and molding, thereby making it possible to keep good moldability even with a small amount of the binder. Usable as the lubricant are aliphatic acids such as stearic acid or their metal salts, silicone oils, various waxes, etc.

[B] Compression-Molding Apparatus

Figure 8A:
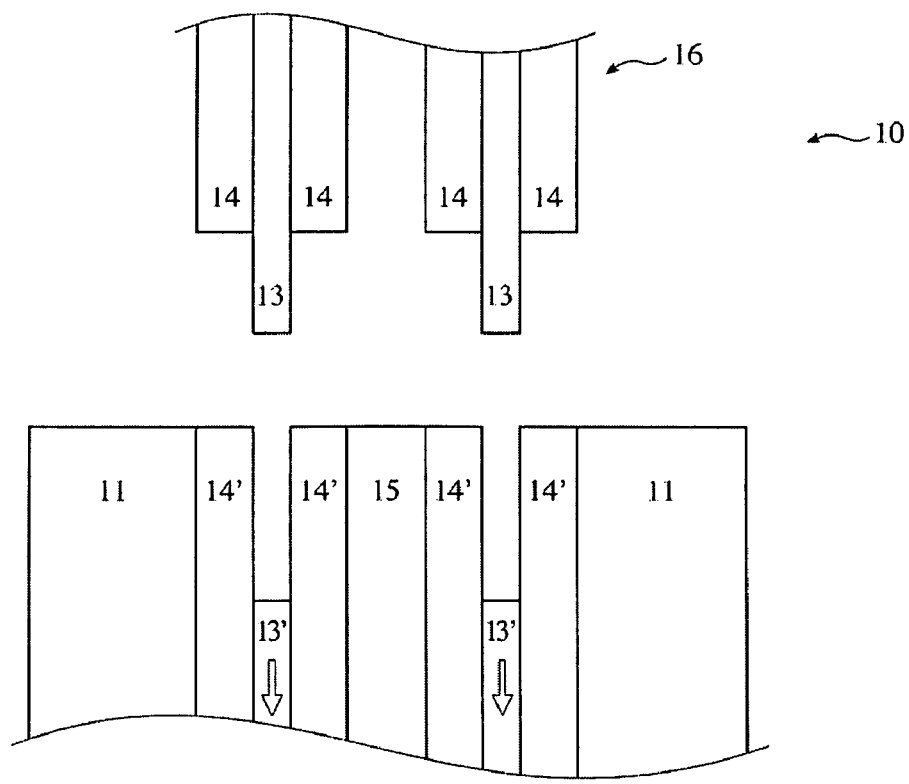
FIG. 8(a) is a partial cross-sectional view showing an apparatus for compression-molding the permanent magnet-embedded rotor of the present invention.

Taking the rotor shown in FIG. 1(a) for example, an apparatus for compression-molding the rotor of the present invention will be explained referring to FIGS. 8(a)-8(c). The compression-molding apparatus 10 is a so-called double-acting press comprising a die 11, which comprises upper and lower punches 13, 13' for compression-molding bonded magnet portions 1, upper and lower punches 14, 14' for compression-molding a soft magnetic portion 2, and a core pin 15 for forming an opening in the center of the molded body.

Figure 8B:
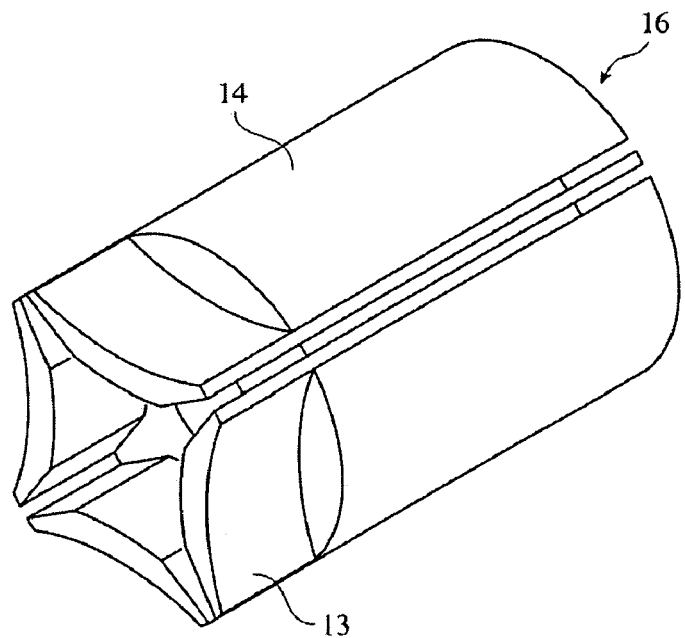
FIG. 8(b) is a perspective view showing an upper punch assembly in the compression-molding apparatus shown in FIG. 8(a)
Figure 8C:
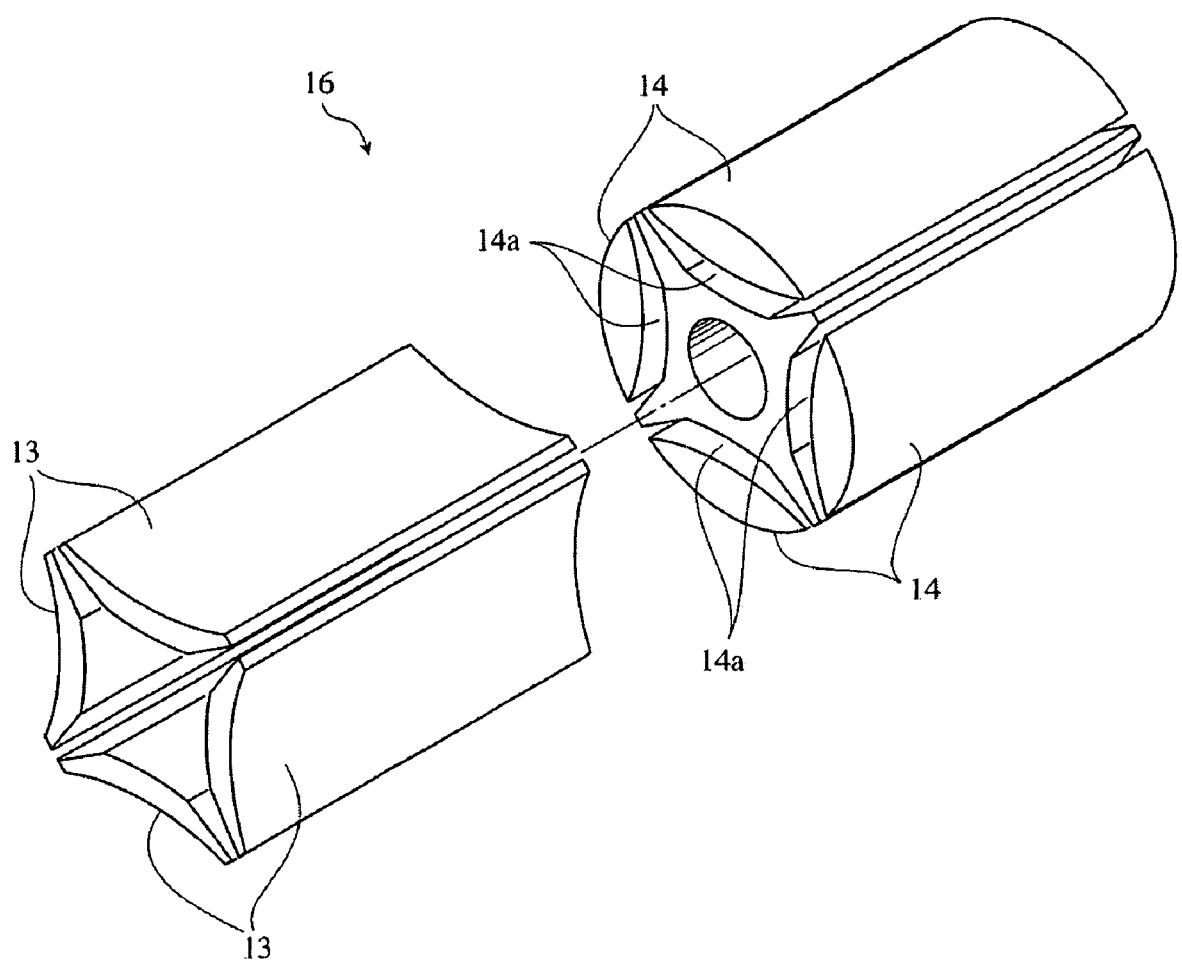
FIG. 8(c) is a perspective view showing the upper punch assembly of FIG. 8(b), which is disassembled to upper punches for molding bonding parts and upper punches for molding soft magnetic portions.

FIG. 8(b) shows an assembly 16 of the upper punches 13, 14, and FIG. 8(c) shows upper punches 13 for molding the bonded magnet portions 1 and an upper punch 14 for molding the soft magnetic portion 2 in the assembly 16. An assembly (not shown) of lower punches 13', 14' has basically the same structure as that of the upper punch assembly 16. The compression-molding apparatus 10 is adapted for four bonded magnet portions 1, comprising four upper punches 13 and four lower punches 13'. The upper punch 14 has a cylindrical shape having four openings 14a corresponding to the upper punches 13.

It is possible to prevent the rotor from being cracked by springback, by providing a die cavity in its upper portion with a taper for suppressing drastic springback, by reducing friction resistance by decreasing the surface roughness of the cavity, or by reducing friction resistance by a lubricant, etc.

[C] Compression-Molding Method (1) Method (1)

Figure 9:
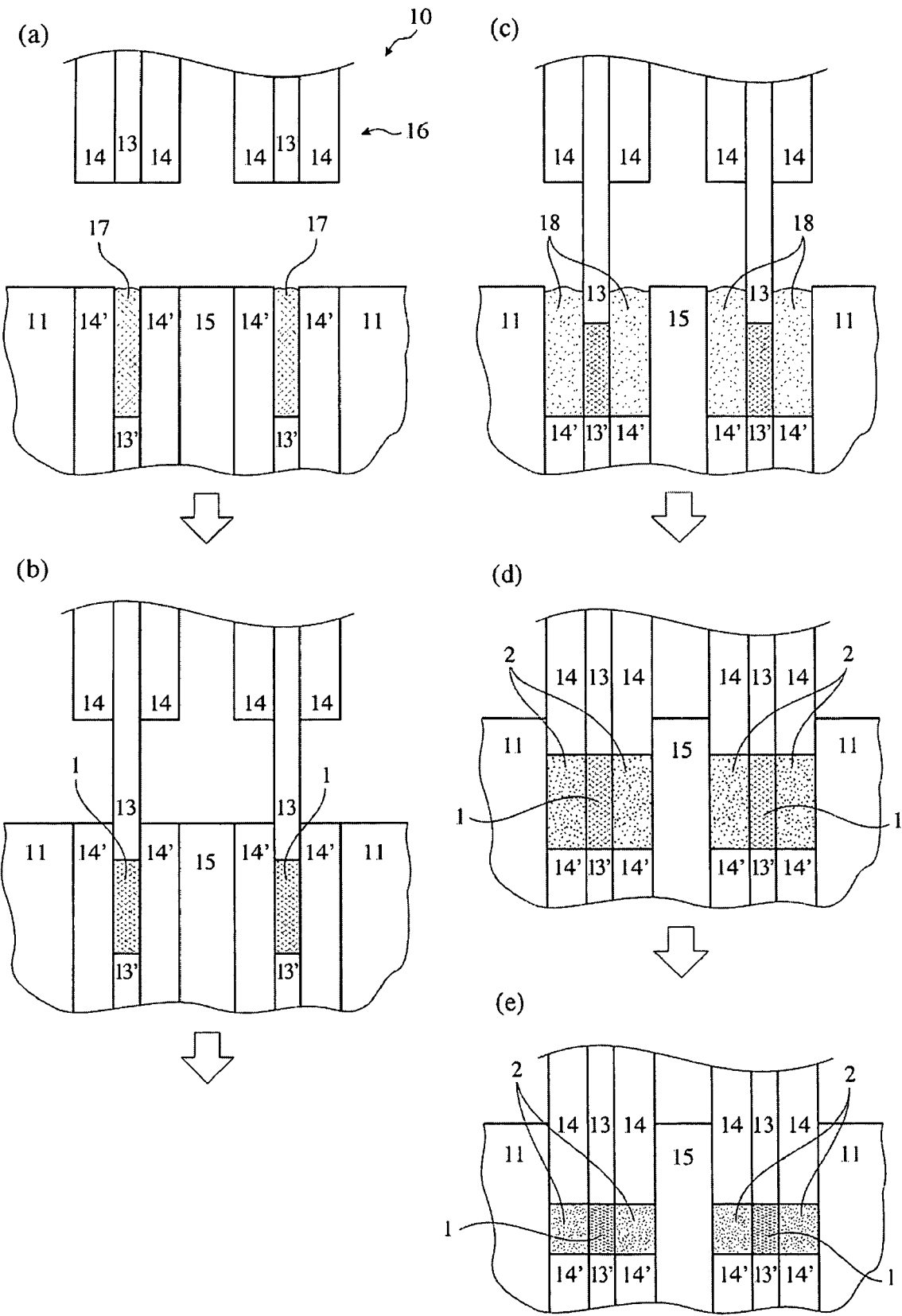
FIG. 9 is a transverse cross-sectional view showing the compression-molding steps of the permanent magnet-embedded rotor of the present invention using the apparatus of FIG. 8(a)

The production of the rotor by the above method (1) using the compression-molding apparatus 10 shown in FIG. 8 is conducted by the flowing steps as shown in FIG. 9.

(a) Step (a)

The lower punches 13' are lowered to provide cavities for molding bonded magnet portions, into which a magnet powder compound 17 mainly composed of 100 parts by mass of magnet powder having an average particle size of 50-200 μm and 1-5 parts by mass of a thermosetting resin binder is supplied.

(b) Step (b)

The upper punches 13 are lowered to conduct the preliminary molding of the magnet powder compound 17 at a pressure of 200 MPa, for instance, to form a thicker bonded magnet portion 1 than the target thickness of the rotor.

(c) Step (c)

The lower punches 14' are lowered to the height of the lower punches 13' to provide a cavity for molding a soft magnetic portion 2, into which a soft magnetic powder compound 18 mainly composed of 100 parts by mass of soft magnetic powder having an average particle size of 1-50 μm and 0.3-2 parts by mass of a thermosetting resin binder.

(d) Step (d)

The upper punches 14 are lowered to the height of the upper punches 13 to conduct the preliminary molding of the soft magnetic powder compound 18, to form the soft magnetic portion 2. This preliminary molding adheres the soft magnetic portion 2 to the bonded magnet portion 1.

(e) Step (e)

The upper punches 13 and 14 are further lowered to integrally mold the bonded magnet portion 1 and the soft magnetic portion 2 at a higher pressure (for instance, 1000 MPa) than the preliminary molding pressure. With a slight step provided between the upper punches 13, 14 and the lower punches 13', 14' for the difference in springback between the bonded magnet portions 1 and the soft magnetic portion 2, they can finally be provided with the same thickness. In the case of using an anisotropic magnet powder, a magnetic field is applied at least during molding.

When a thermosetting resin such as epoxy resins is used as a binder, the preliminary molding of the magnet powder compound 17 and the soft magnetic powder compound 18 can be conducted at room temperature. To increase a filling density, however, it may be heated to about 120° C.

After elevating the upper punches 13, 14, the lower punches 13', 14' are elevated to take the resultant molded body out of the molding apparatus 10. The resultant molded body is heat-cured at a temperature of 250° C. or lower. The molded body is integrally provided with a rotation shaft 3, and magnetized to obtain a rotor integrally comprising permanent magnets and a yoke.

This compression-molding method supplying the magnet powder compound 17 and the soft magnetic powder compound 18 to a single apparatus to conduct preliminary molding and main molding successively can produce a permanent magnet-embedded rotor having bonded magnet portions 1 completely embedded in a soft magnetic portion 2 at a low cost, without needing bonding and assembling steps.

By conducting the preliminary molding and the main molding separately, the press-bonding strength of the bonded magnet portions 1 to the soft magnetic portion 2 can be increased. Particularly in the case of using the method (1) comprising preliminarily molding a magnet powder compound comprising magnet powder having a large particle size and then charging a soft magnetic powder compound comprising soft magnetic powder having a small particle size into the die, part of the soft magnetic powder penetrates into the bonded magnet portions 1, resulting in a rotor having a high press-bonding strength between the bonded magnet portions 1 and the soft magnetic portion 2. On the contrary, a conventional rotor comprising magnets bonded by an adhesive to the soft magnetic portion has uneven thickness in bonding layers, and uneven bonding strength due to rough bonding surfaces, resulting in low accuracy in the position of the magnet, and difficulty in obtaining stable bonding strength. Some rotors having specifications of providing a bonding strength of 10 MPa or more actually do not have a bonding strength of 5 MPa or more. On the other hand, rotors obtained by the method of the present invention have a press-bonding strength of 10 MPa or more, further 15 MPa or more in terms of a shear stress between the bonded magnet portions 1 and the soft magnetic portion 2.

(2) Method (2)

It comprises preliminarily molding bonded magnet portions from a magnet powder compound mainly composed of magnet powder having an average particle size of 50-200 μm and a thermosetting resin binder, and a soft magnetic portion from a soft magnetic powder compound mainly composed of soft magnetic powder having an average particle size of 1-50 μm and a thermosetting resin binder separately, assembling the bonded magnet portions and the soft magnetic portion in a die, making them integral at a higher pressure than the preliminary molding pressure, and finally thermosetting the resin. The molding time is drastically shortened in this method because of no need to operate core pins in a complicated manner. Rotors obtained by this method have a press-bonding strength of 5 MPa or more, further 5.5 MPa or more in terms of shear stress between the bonded magnet portions and the soft magnetic portion.

(3) Method (3)

After the preliminary molding of a soft magnetic powder compound, a magnet powder compound is supplied. Though rotors obtained by this method have low press-bonding strength between the bonded magnet portions and the soft magnetic portion, there is no need to hold a preliminarily molded body in the cavity. Accordingly, this method is effective to form extremely thin bonded magnet portions. In addition, with a rotation shaft placed in a cavity, it is possible to produce a rotor comprising a rotation shaft integrally fixed by one compression-molding operation.

In the above production method, rotors having a reduced eddy current loss because of high electric resistance can be obtained, by providing pluralities of cavities for a magnet powder compound in radial directions in a die such that each magnetic pole is formed by each bonded magnet portion, and by supplying a low-electric-conductivity soft magnetic powder compound around them. In the conventional method, pluralities of coated magnets are assembled by bonding to form each magnetic pole, thereby reducing an eddy current loss. Accordingly, it has many steps, resulting in a high production cost. On the contrary, because the method of the present invention can produce a rotor with the bonded magnet portions integral with the soft magnetic portion, it has a few steps and a low production cost. The larger a motor is, the more current flows through permanent magnets, resulting in an increased eddy current loss. Accordingly, the method of the present invention is particularly suitable for producing rotors for large motors.

The present invention will be explained in further detail referring to Examples below, without intension of restricting the present invention thereto.

Example 1, Comparative Example 1

Figure 10A:
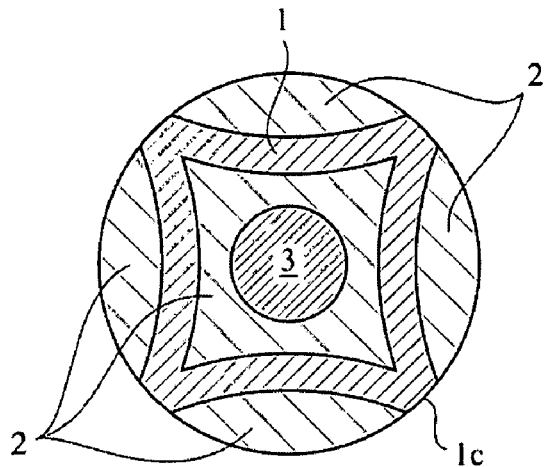
FIG. 10(a) is a schematic cross-sectional view showing a permanent magnet-embedded rotor in Comparative Example 1.

To suppress the generation of cracking in a rotor by springback, the shapes of the rotor and bonded magnet portions were modified. The rotor of Comparative Example 1 shown in FIG. 10(a), which is likely to be cracked, has a cross section shape comprising bonded magnet portions 1 and a soft magnetic portion 2, and the bonded magnet portions 1 have sides curved toward a center of the rotor, which are connected circularly. The connecting ends of the bonded magnet portions 1 are exposed on a peripheral side surface of the rotor.

100 parts by mass of magnet powder was mixed with 3 parts by mass of an epoxy resin (binder) to prepare a magnet powder compound, and 100 parts by mass of soft magnetic powder was mixed with 1.1 parts by mass of an epoxy resin to prepare a soft magnetic powder compound. 0.3 parts by mass of calcium stearate as a lubricant was added to 100 parts by mass of each powder.

The resultant rotor had an outer diameter of 50 mm and an axial length of 100 mm, with the bonded magnet portions 1 as thick as 5 mm. The bonded magnet portions 1 had wide exposed end surfaces, a width ratio (exposure ratio) of each exposed end surface 1c to the entire periphery of the rotor being 3.8%. FIG. 8(b) shows a tensile stress distribution of the rotor of FIG. 8(a) when it was deformed. The largest tensile stress was applied to the exposed end surfaces 1c of the bonded magnet portions 1, where the tensile stress was 200 MPa.

Separately designed was a rotor of Example 1 comprising arcuate bonded magnet portions 1, whose center portions were thickest as 5 mm, and ends were thinnest as 1 mm, embedded in a soft magnetic portion 2, such that the ends 1a, 1a of adjacent bonded magnet portions 1, 1 were separate from each other to prevent the short-circuiting of a magnetic flux between magnetic poles, each end surface 1c being exposed on a peripheral side surface 4, as shown in FIG. 1(a). The exposure ratio of each exposed end surface 1c of the bonded magnet portions 1 was 0.6%. As shown in FIG. 1(b), the largest tensile stress was applied to the exposed end surfaces 1c of the bonded magnet portions 1, where the tensile stress was 2 MPa.

FIG. 11 shows the relation between an exposure ratio and the maximum residual stress on an exposed end surface. Because the soft magnetic portion 2 has a tensile strength of about 25 MPa, it has been found that the exposure ratio should be 2% or less in such a design that the residual stress is about 20 MPa or less.

Comparative Example 2

Figure 12A:
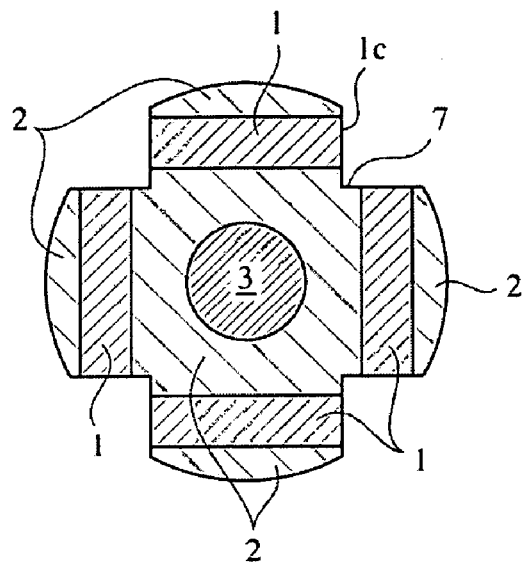
FIG. 12(a) is a schematic cross-sectional view showing a permanent magnet-embedded rotor in Comparative Example 2.
Figure 12B:
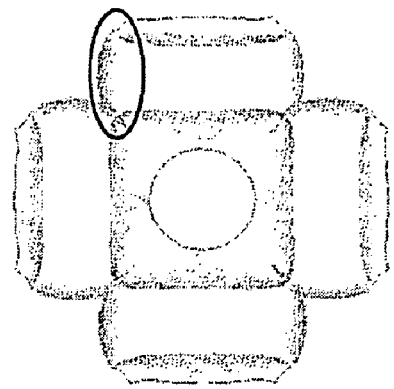
FIG. 12(b) is a schematic view showing a tensile stress distribution in the permanent magnet-embedded rotor shown in FIG. 12(a) when it was deformed.

As shown in FIG. 12, a rotor comprising bonded magnet portions 1 and soft magnetic portions 2, with notches 7 at the ends of the bonded magnet portions 1. The rotor had an outer diameter of 50 mm, and each bonded magnet portion 1 had a thickness of 5 mm. Each bonded magnet portion 1 had a rectangular cross section, with each end surface 1c exposed to the notch 7. The exposure ratio of each end surface 1c of the bonded magnet portion 1 was 3.5%. The exposure ratio of each end surface 1c of the bonded magnet portion 1 was a ratio of the length of each exposed surface 1c to the total length of the peripheral side surface including the length of the notches 7 in FIG. 12. In the shape shown in FIG. 12, the largest tensile stress was applied to the exposed end surfaces 1c of the bonded magnet portions 1, where the tensile stress was 183 MPa.

It was found by analysis that this rotor met substantially the same relation between the exposure ratio and the maximum residual stress at exposed end surfaces as shown in FIG. 11, despite slight difference. The same stress analysis was conducted with changed thickness of the center and end portions of the bonded magnet portions 1, resulting in the same results.

Example 2

Figure 10B:
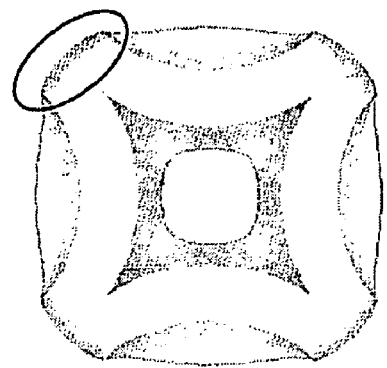
FIG. 10(b) is a schematic view showing a tensile stress distribution in the permanent magnet-embedded rotor shown in FIG. 10(a) when it was deformed.

In a rotor shown in FIG. 2(a), in which the end surfaces 1c of bonded magnet portions 1 were not exposed to a peripheral side surface 4, the thinnest portions 2a of the soft magnetic portion 2 between the end surfaces 1c of the bonded magnet portions 1 and the peripheral side surface 4 being as thin as 0.3 mm, a tensile stress was 19 MPa in the thinnest portions 2a, to which the largest tensile stress was applied. Though it was expected that a residual stress were relaxed in the rotor of Comparative Examples 1 and 2 shown in FIGS. 10 and 12, in which the soft magnetic portion 2 was divided by the bonded magnet portions 1 to inner and outer portions, outer soft magnetic portions 2 being freely expandable, it was found that cracking was actually suppressed more in the rotor having the shape shown in FIG. 2(a).

Figure 13:
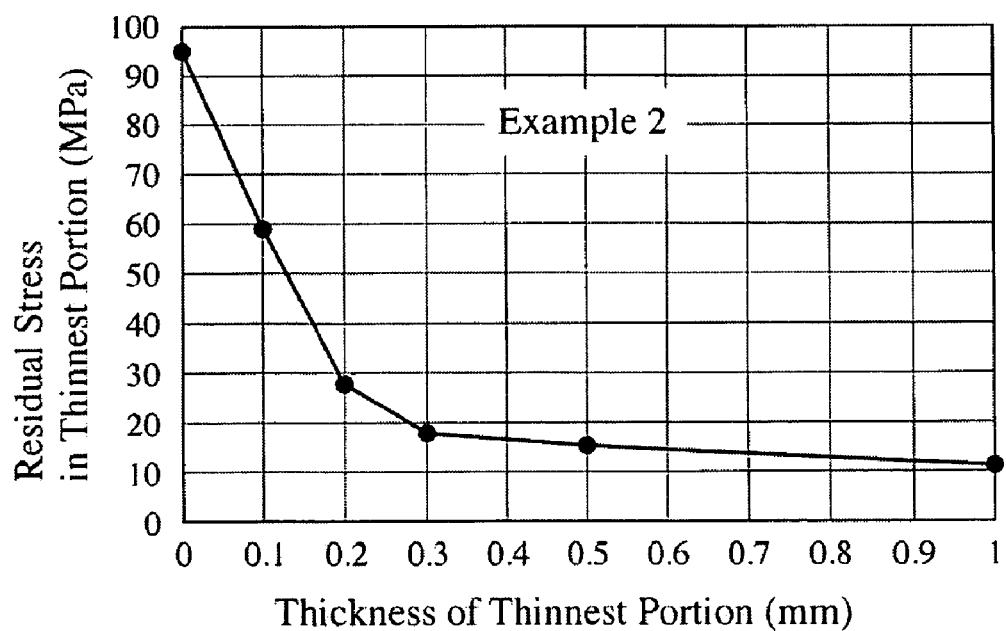
FIG. 13 is a graph showing the relation between the thickness of the thinnest portion of a soft magnetic portion and a residual stress there.

FIG. 13 shows the relation between the thickness of the thinnest portion 2a and a maximum residual stress in that portion. In a rotor design having a residual stress of about 20 MPa or less because a soft magnetic portion 2 has a tensile strength of about 25 MPa, the thinnest portion 2a should be as thick as 0.3 mm or more. However, when the thinnest portion 2a is thicker than 1.5 mm, there is extreme short-circuiting of a magnetic flux in the thinnest portions 2a. Accordingly, the thinnest portion 2a should be 1.5 mm or less.

Example 3

FIG. 3(a) shows a rotor comprising bonded magnet portions 1 each having a rectangular cross section embedded in a soft magnetic portion 2 with gaps between their ends 1a, 1a. The rotor had an outer diameter of 50 mm, and each bonded magnet portion 1 had a thickness of 5 mm, and a transverse width of 25 mm. The thinnest portions 2a of the soft magnetic portion 2 had a thickness of 1.3 mm. FIG. 3(b) shows a tensile stress distribution in the rotor shown in FIG. 3(a) when it was deformed. The largest tensile stress was applied to the thinnest portions 2a of the yoke, where the tensile stress was 11 MPa.

It was found by analysis that this rotor had substantially the same relation between the thickness of the thinnest portions 2a and the maximum residual stress in the thinnest portions 2a as shown in FIG. 13, despite slight difference. Stress analysis with changed thickness of the bonded magnet portions provided the same results.

Example 4

FIG. 4(a) shows a rotor comprising bonded magnet portions 1 totally embedded in a soft magnetic portion 2, each bonded magnet portion 1 having a cross section shape having an arcuate side extending along a periphery of the rotor and a linear bottom. The rotor had an outer diameter of 50 mm, and the bonded magnet portion 1 had the maximum width of 7 mm, and a bottom length of 35 mm. The soft magnetic portion 2 had a thin portion 2a having a thickness of 1 mm outside the bonded magnet portions 1. FIG. 4(b) shows a tensile stress distribution in the rotor of FIG. 4(a) when it was deformed. The largest tensile stress was applied to the thin portion 2a of the soft magnetic portion 2, where the tensile stress was 11 MPa.

It was by analysis found that this rotor had substantially the same relation between the thickness of the thin portion 2a and the maximum residual stress therein as shown in FIG. 13, despite slight difference. Stress analysis with changed thickness of the bonded magnet portions provided the same results.

As shown in Table 1, the comparison of the rotors of Examples 1-4 revealed that the highest motor output was obtained in Example 1 despite substantially the same area ratio of the bonded magnet portions to the rotor (measured on a transverse cross-sectional view). It is thus clear that the rotor of Example 1 had the best structure.

TABLE 1

| No. | Maximum Output of Motor (kW) | Area Ratio of Bonded Magnet Portions (%) |
|---|---|---|
| Example 1 | 2.4 | 29.5 |
| Example 2 | 2.3 | 31.8 |

TABLE 1-continued

| No. | Maximum Output of Motor (kW) | Area Ratio of Bonded Magnet Portions (%) |
|---|---|---|
| Example 3 | 2.1 | 29.3 |
| Example 4 | 2.2 | 32.8 |

Example 5

Using Nd—Fe—B magnet powder having an average particle size of 96.9 μm (measured by HEROS RODOS available from Sympatec), pure iron powder having an average particle size of 31.2 μm, an epoxy resin (binder), and calcium stearate (lubricant), rotors having the same shape shown in FIG. 1(a) were produced by the following three methods (a)-(c). A magnet powder compound was obtained by adding 3 parts by mass of an epoxy resin and 0.5 parts by mass of calcium stearate to 100 parts by mass of the magnet powder. A soft magnetic powder compound was obtained by adding 1.1 parts by mass of an epoxy resin and 0.5 parts by mass of calcium stearate to 100 parts by mass of the soft magnetic powder. A preliminary molding pressure was 200 MPa, and a preliminary molding temperature was room temperature. Integrally molding pressure was 1000 MPa. Curing was conducted at 170° C. for 2 hours, and the cured product was cooled to room temperature over 30 minutes.

(a) A method comprising disposing a preliminarily molded body of the magnet powder and the binder in a die, supplying a compound mainly composed of the soft magnetic powder and the binder into the die for preliminary molding, applying a higher pressure than the preliminary molding pressure to make them integral, and finally curing the integrated body.

(b) A method comprising separately forming a preliminarily molded body of the magnet powder and the binder and a preliminarily molded body of the soft magnetic powder and the binder, assembling these preliminarily molded bodies in a die, applying a higher pressure than the preliminary molding pressure to make them integral, and finally curing the integrated body.

(c) A method comprising disposing a preliminarily molded body of the soft magnetic powder and the binder in a die, supplying a compound mainly composed of the magnet powder and the binder into the die for preliminary molding, applying a higher pressure than the preliminary molding pressure to make them integral, and finally curing the integrated body.

The bonded magnet portion and the soft magnetic portion were partially cut out of each of the resultant rotors to evaluate their magnetic properties. The bonded magnet portion had $Br \geq 0.6$ T and $Hcj \geq 700$ kA/m, and the soft magnetic portion had $Bm \geq 1.4$ T and $Hc \leq 800$ A/m. As the press-bonding strength between the bonded magnet portions and the soft magnetic portion, a tensile strength at an interface between the bonded magnet portion and the soft magnetic portion was measured using a small test piece according to JIS-K7113. The results are shown in Table 2.

TABLE 2

| Compression Molding Method | Tensile Strength (MPa) |
|---|---|
| (a) | 15.2 |
| (b) | 5.7 |
| (c) | 5.5 |

Example 6

Figure 14:
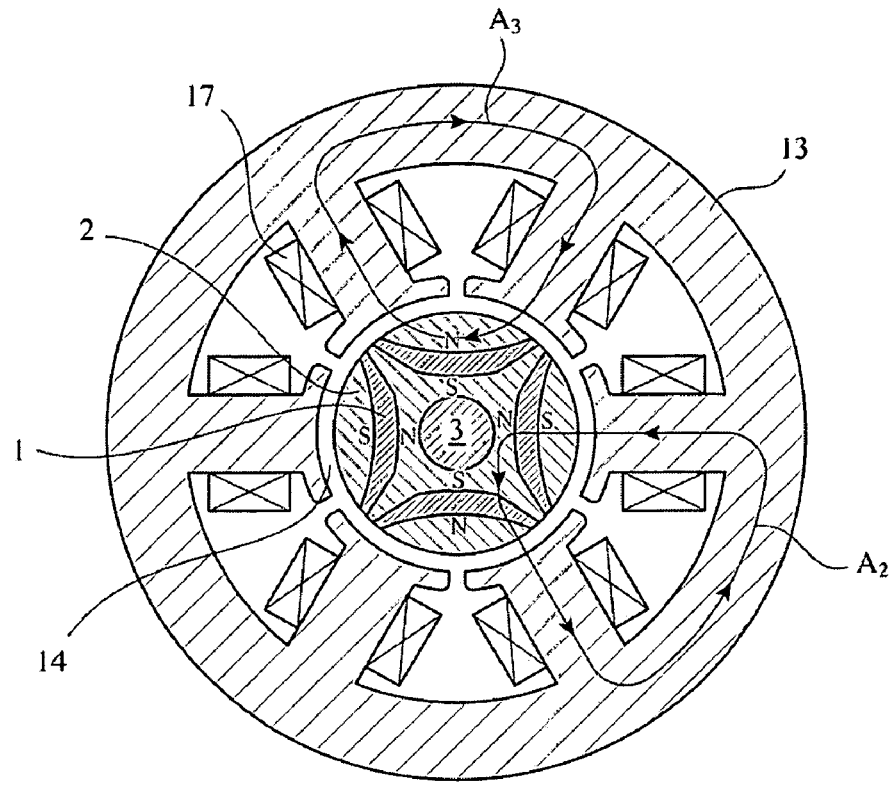
FIG. 14 is a cross-sectional view showing a rotating machine comprising the permanent magnet-embedded rotor of Example 1.

FIG. 14 shows a rotating machine comprising the permanent magnet-embedded rotor of Example 1. The rotor was surrounded by a soft magnetic material having electric conductivity of 20 kS/m or less. In the figure, $A_2$ denotes a magnetic circuit generating a magnet torque, and $A_3$ denotes a magnetic circuit generating a reluctance torque.

Using a magnet powder compound comprising 100 parts by weight of isotropic Nd—Fe—B magnet powder and 2 parts by weight of an epoxy resin, and a soft magnetic powder compound comprising 100 parts by weight of insulation-coated pure iron powder and 2 parts by weight of an epoxy resin, a rotor was produced by the method shown in FIG. 9 under the conditions of a preliminary molding pressure of 200 MPa and a main molding pressure of 1000 MPa. Curing was conducted at 170° C. for 2 hours, and the cured product was cooled to room temperature over 30 minutes. A rotation shaft was mounted to the resultant permanent magnet-embedded rotor, and the bonded magnet portions were magnetized substantially in their thickness directions.

With the above rotor combined with a stator having six slots and a Y-connected winding, a 120-degree rectangular wave current was supplied to the winding to measure a rotation torque. The ampere-turn number in each slot was 300 AT. The bonded magnet portions were partially cut out to evaluate their magnetic properties, which were $Br \geq 0.6$ T, and $Hcj \geq 700$ kA/m. Also, the soft magnetic portion was partially cut out to evaluate its magnetic properties, which were $Bm \geq 1.4$ T, and $Hc \leq 800$ A/m.

Figure 15:
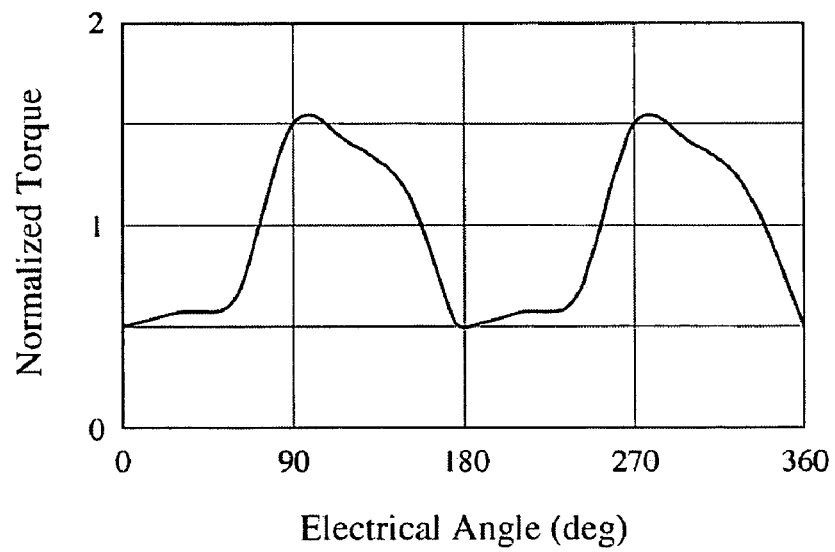
FIG. 15 is a graph showing the relation between a torque (normalized) generated by the rotating machine of Example 6 and an electrical angle.
Figure 16:
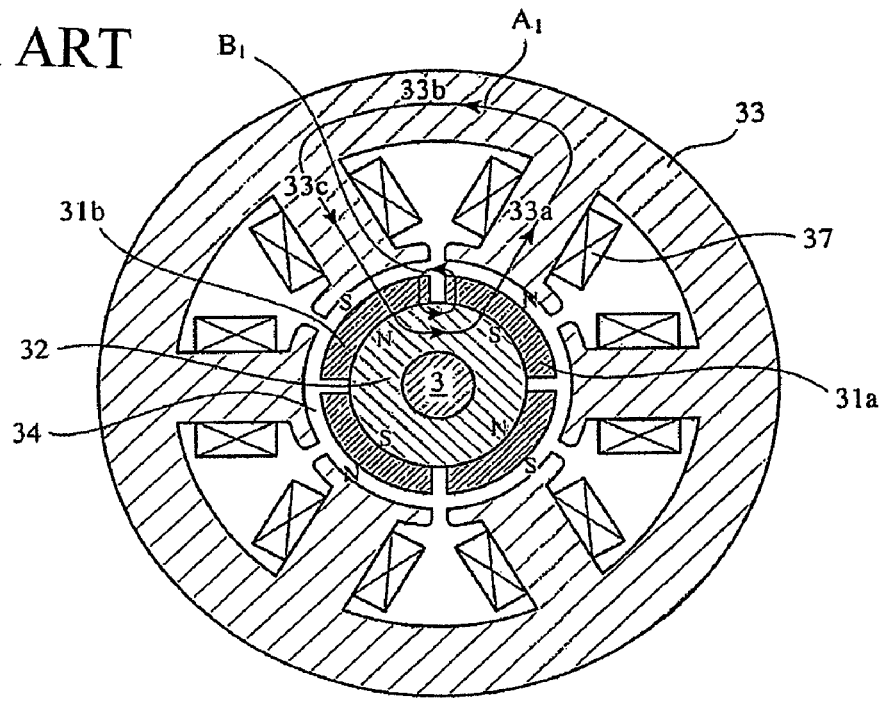
FIG. 16 is a cross-sectional view showing a conventional surface permanent magnet (SPM) motor.
Figure 17:
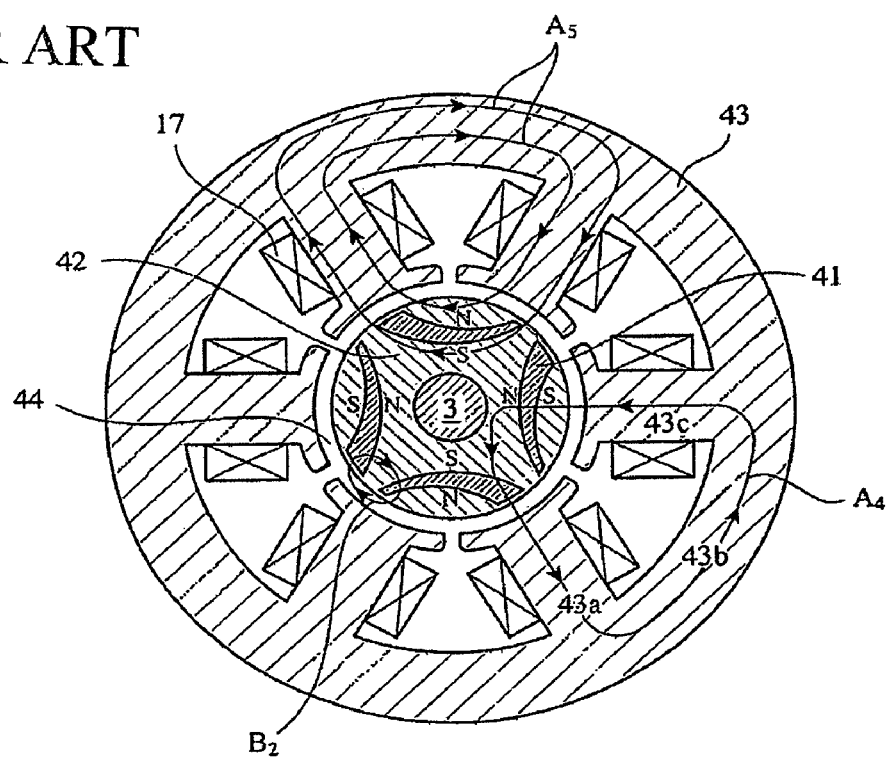
FIG. 17 is a cross-sectional view showing a conventional interior permanent magnet (IPM) motor.

A torque generated by this rotating machine was measured. The relation between an electrical angle and a normalized torque is shown in FIG. 15. When a usual permanent magnet rotor is used, torque-generating center angles are 90° and 270° as electrical angles, because a rotation torque is generated by a magnetic field generated by permanent magnets, which crosses stator coils. It has been found, however, that the maximum-torque-generating center angles move to substantially 100° and 280° in the rotor of the present invention, because it generates a reluctance torque, too.

EFFECT OF THE INVENTION

As described above, because the permanent magnet-embedded rotor of the present invention has a structure, in which bonded magnet portions composed of magnet powder and a binder are embedded in a soft magnetic portion composed of soft magnetic powder and a binder, the magnetic pole surfaces of the bonded magnet portions being substantially embedded in the soft magnetic portion, it has the advantages that (a) there are no gaps acting as magnetic resistance between the bonded magnet portions and the soft magnetic portion, so that a magnetic flux can be utilized efficiently; (b) high dimensional accuracy is achieved even in thin portions between the bonded magnet portions and a peripheral side surface; (c) a reluctance torque is effectively used; and (d) the number of assembling steps can be reduced. In addition, cracking due to springback can be prevented by forming the bonded magnet portions in desired shapes, or by setting the width of each exposed end surface of the bonded magnet portions at 2% or less of the entire periphery of the rotor. Further, a press-bonding strength between the bonded magnet portions and the soft magnetic portion can be increased by desirably restricting the particle sizes of the magnet powder and the soft magnetic powder.

The production method of the present invention enjoys a high degree of freedom in the shapes of the bonded magnet portions. Though the conventional rotor having magnets bonded by an adhesive has unnecessary gaps between a yoke and the magnets, the present invention provides a high-performance, permanent magnet-embedded rotor without gaps between them using a small amount of a resin and a small number of steps, because bonded magnet portions and a soft magnetic portion are integrally compression-molded. In addition, it is possible to prevent the short-circuiting of a magnetic flux generated by the bonded magnet portions in yoke portions between magnetic poles, thereby enabling the effective use of the magnetic flux from bonded magnet portions.

What is claimed is:

1. A method for producing a rotor comprising bonded magnet portions and a soft magnetic portion, the method comprising, in the order mentioned,
    (a) preliminarily molding steps consisting of compressing a magnet powder compound mainly composed of magnet powder and a binder to mold said bonded magnet portions; charging a soft magnetic powder compound mainly composed of soft magnetic powder and a binder, such that said soft magnetic portion is in contact with said bonded magnet portions, and compressing said soft magnetic powder compound to mold said soft magnetic portion; and
    (b) simultaneously compressing said bonded magnet portions and said soft magnetic portion to make said bonded magnet portions and said soft magnetic portion integral.

2. The method for producing a rotor according to claim 1, wherein a thermosetting resin is used as said binder, and wherein a thermosetting treatment is conducted after said bonded magnet portions and said soft magnetic portion are made integral.

3. A method for producing a rotor comprising bonded magnet portions and a soft magnetic portion, the method comprising
    (1) preliminarily molding steps consisting of compressing (a) a magnet powder compound mainly composed of magnet powder and a binder to mold said bonded magnet portions, and (b) a soft magnetic powder compound mainly composed of soft magnetic powder and a binder to mold said soft magnetic portion separately; assembling said bonded magnet portions and said soft magnetic portion; and
    (2) simultaneously compressing said bonded magnet portions and said soft magnetic portion to make said bonded magnet portions and said soft magnetic portion integral.

4. The method for producing a rotor according to claim 3, wherein a thermosetting resin is used as said binder, and wherein a thermosetting treatment is conducted after said bonded magnet portions and said soft magnetic portion are made integral.

5. A method for producing a rotor comprising bonded magnet portions and a soft magnetic portion, the method comprising, in the order mentioned,
    (a) preliminarily molding steps consisting of compressing a soft magnetic powder compound mainly composed of soft magnetic powder and a binder to mold said soft magnetic portion; charging a magnetic powder compound mainly composed of magnet powder and a binder, such that said bonded magnet portions are in contact with said soft magnetic portion, and compressing said magnet powder compound to mold said bonded magnet portions; and
    (b) simultaneously compressing said bonded magnet portions and said soft magnetic portion to make said bonded magnet portions and said soft magnetic portion integral.

6. The method for producing a rotor according to claim 5, wherein a thermosetting resin is used as said binder, and wherein a thermosetting treatment is conducted after said bonded magnet portions and said soft magnetic portion are made integral.

* * * * *